United States Patent Office 3,391,151
Patented July 2, 1968

3,391,151
BENZHYDRYLTHIAZOLE DERIVATIVES
Martin A. Davis, Montreal, Quebec, and David J. Campbell, Pincourt, Quebec, Canada, assignors to American Home Products Corporation, New York, N.Y., a corporation of Delaware
No Drawing. Filed May 23, 1966, Ser. No. 551,888
7 Claims. (Cl. 260—302)

This invention relates to novel chemical compounds having useful biological properties. More particularly, this invention relates to novel thiazoles substituted in position 2 with a benzhydryl group and to their pharmacologically acceptable acid addition salts. The compounds may be represented by the following general Formula I:

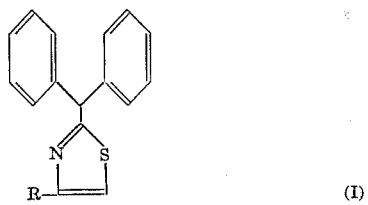

in which R represents a lower alkyl group containing from 1–4 carbon atoms.

The compounds of this invention may be prepared by interacting 2,2-diphenylthioacetamide (obtained conveniently from diphenylacetonitrile and thioacetamide following a general procedure set forth by E. C. Taylor et al. in J. Amer. Chem. Soc., 82, 2656 (1960)) with an alpha-halo carbonyl compound, such as, an alpha-halo ketone, for example chloropropanone, to give the corresponding thiazole of Formula I as the hydrohalide addition salt from which the free base is obtained by treatment with alkali and extraction with a water-immiscible solvent. The reaction is advantageously carried out in an inert solvent and at elevated temperature, for example in boiling chloroform. The product may be isolated by removal of the solvent and purified by recrystallation from an appropriate solvent.

The following formulae, in which R is as defined above, and X represents a halogen with an atomic weight greater than 19, will illustrate this invention.

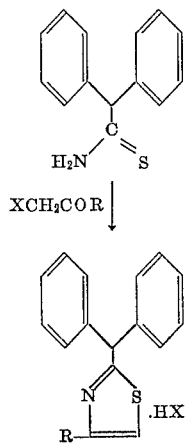

The novel compounds of this invention have important biological properties and are useful as medicaments. They possess larvicidal effects against horse strongyles and may be used to decontaminate premises or pastures which have become infected with members of the strongylidae family, for example, hookworms, trichostrongylidae or metastrongylidae. For such purpose they may be formulated as suspensions in an aqueous vehicle so as to contain from 0.01 to 0.001 mole per litre of the active ingredient.

The compounds further possess useful effects on the central nervous system of mammals. They decrease spontaneous activity, inhibit electroshock-induced convulsive seizures and cause ataxia; they are thus central nervous system depressants.

The following descriptive examples will illustrate this invention but are not to be construed as limiting it thereto.

Example 1

A solution of 2,2-diphenylthioacetamide (9.1 g., 0.04 mole) and chloropropanone (4.4 g., 0.05 mole) in chloroform (125 ml.) is heated under reflux for 24 hours. The solvent is removed in vacuo and the oily residue is dissolved in dry ether (125 ml.). After a short time the solution deposits a copious quantity of white crystals. These are collected, dried, and identified as 2-benzhydryl-4-methylthiazole hydrochloride, M.P. 149–153° C., unchanged on recrystallization from a mixture of 2-propanol and ether. Analysis confirms the empirical formula $C_{17}H_{16}ClNS$.

In the same manner, but using 1-chlorobutan-2-one or 1-bromopentan-2-one as starting materials, the compounds 2-benzhydryl-4-ethylthiazole hydrochloride and 2-benzhydryl-4-propylthiazole hydrobromide are obtained, respectively.

Example 2

2-benzhydryl-4-methylthiazole hydrochloride, prepared as described in Example 1 is stirred with dilute aqueous sodium bicarbonate solution. The reaction mixture is extracted with dichloromethane and the organic layer is dried and concentrated in vacuo. The residual oil crystallizes when triturated with a little petroleum ether. Recrystallization from hexane affords 2-benzhydryl-4-methylthiazole, M.P. 63–65° C. Analysis confirms the empirical formula $C_{17}H_{15}NS$.

In the same manner but using 2-benzhydryl-4-ethylthiazole hydrochloride or 2-benzhydryl-4-propylthiazole hydrobromide as starting materials, there are obtained 2-benzhydryl-4-ethylthiazole and 2-benzhydryl-4-propylthiazole, respectively.

We claim:
1. A compound selected from the group which consists of compounds of the formula

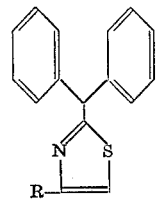

wherein R represents a lower alkyl group and acid addition salts thereof with pharmacologically acceptable acids.
2. 2 - benzhydryl - 4 - methylthiazole, as claimed in claim 1.
3. 2-benzhydryl-4-ethylthiazole, as claimed in claim 1.
4. 2-benzhydryl-4-propylthiazole, as claimed in claim 1.
5. 2-benzhydryl - 4 - methylthiazole hydrochloride, as claimed in claim 1.
6. 2 - benzhydryl - 4 - ethylthiazole hydrochloride, as claimed in claim 1.
7. 2 - benzhydryl - 4 - propylthiazole hydrobromide, as claimed in claim 1.

References Cited
UNITED STATES PATENTS
2,480,450    8/1949    Cocroft et al. _____ 260—302

ALTON D. ROLLINS, Primary Examiner.